May 24, 1966 R. S. HULL 3,253,205
SPEED-CONTROLLED MACHINE MECHANISM PROTECTOR
Filed July 25, 1963
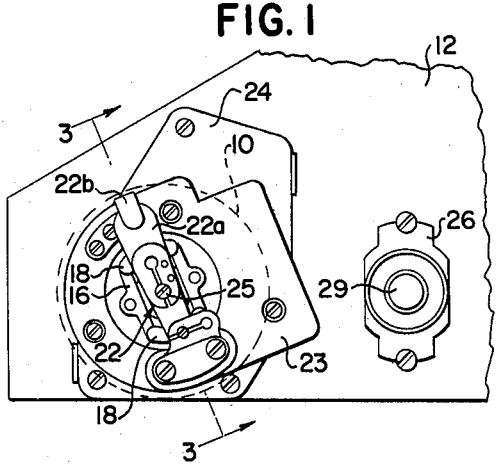
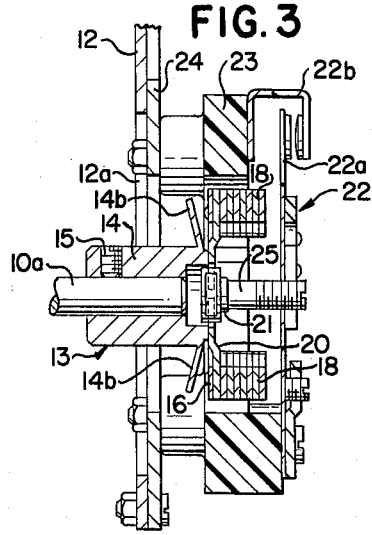
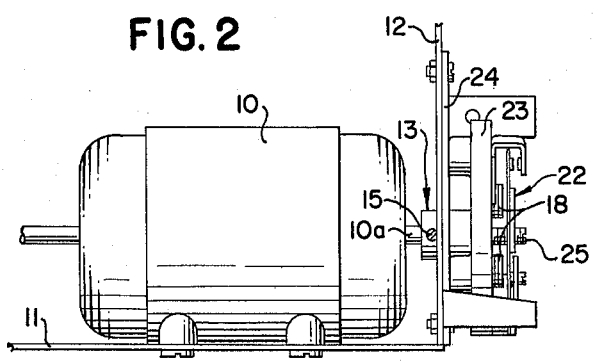
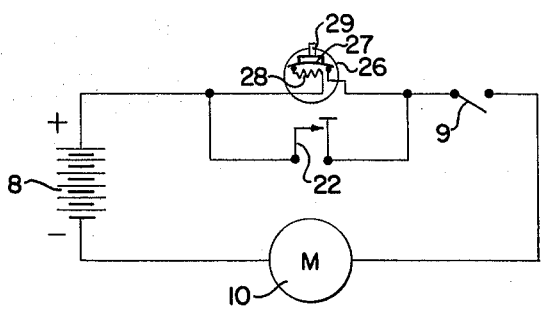
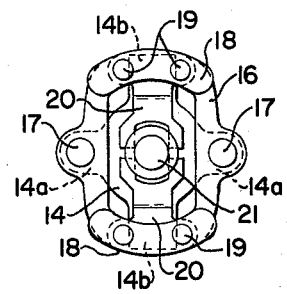
INVENTOR
ROGER S. HULL
BY *Louis A. Kline*
*Wilbert Hawk, Jr.*
HIS ATTORNEYS

# United States Patent Office 3,253,205
Patented May 24, 1966

1

3,253,205
SPEED-CONTROLLED MACHINE MECHANISM PROTECTOR
Roger S. Hull, Dayton, Ohio, assignor to The National Cash Register Company, Dayton, Ohio, a corporation of Maryland
Filed July 25, 1963, Ser. No. 297,536
1 Claim. (Cl. 318—447)

This invention relates generally to new and useful improvements in adding machines and the like, and has particular reference to mechanism protecting means for automatically disconnecting the machine driving motor from its source of operating power whenever either a ball-up of machine elements occurs or a defect in such source of power is of that magnitude to not permit adequate drive of the machine through its cycles of operation.

As is known, most adding and like machines are designed to operate at a cycling speed best suited for safe and efficient operation of their included mechanisms. While such speed may vary to some extent, permitting the machines to be adjusted either faster or slower if conditions so require, anything beyond the outer limits of a prescribed speed therefor is highly undesirable, since same might result either in actual machine damage, should the speed of operation of several mechanisms be such that a collision or like conflict exists therebetween, or in machine misoperation, should the speed of operation of certain mechanisms be such that they are not permitted to carry through the over-all functions assigned to them.

Of course, it is clear that a machine speed less than that desired might be due to a defect in the available power source, whether same be of the alternating current type or of the direct current type. Assuming that such power source is of the latter type, as for example, in the form of a rechargeable battery (or battery pack), being self-contained within the machine proper, either a defect in one of the cells thereof, or sufficient discharge thereof during extended machine use, will at best result in such power source effecting machine cycles of operation at speeds lower than that prescribed for safe and efficient machine use. Furthermore, it is clear that a machine speed less than that desired might be due to mechanism failure, for one reason or another, during a machine operation performed at or near the prescribed cycling speed, resulting either in a ball-up, and hence, complete stoppage of the machine operation while in progress, or in the setting up of sufficient interference thereduring, to slow same down considerably—that is, beyond the lower limits precribed for safe and efficient operation.

With this in mind, the present invention has for its object to overcome both machine damage and machine misoperation whenever, due to either machine mechanism ball-up or inefficient power source, the cycling speed of an adding machine and the like is less than that prescribed for effecting safe and efficient operation of the various mechanisms employed. In so doing, by way of example in the accompanying drawing, the preferred form of construction herein employed disconnects the machine driving motor from its source of power (battery) should such motor, for one reason or another, not attain its full operating speed whenever, through appropriate initiating means, same is called upon to drive the various machine mechanisms employed through a cycle of operation.

Of said drawing:
FIG. 1 is a view in side elevation of the instant invention, as representatively applied to the framework of an adding or like machine;

2

FIG. 2 is a view in rear elevation of the instant invention as so applied in FIG. 1;
FIG. 3 is a view in section of a motor speed sensing portion of the instant invention, taken along line 3—3 of FIG. 1, and being on a scale enlarged therefrom;
FIG. 4 is a detail in front elevation of a governor member included in the speed sensing portion of FIG. 3; and
FIG. 5 is a typical machine operating circuit diagrammatically embodying the instant invention therewithin.

As is the usual practice, the driving motor 10 for adding machines and the like is supported by the machine framework construction, such as being bolted to a lower rear plate 11 thereof (FIG. 2), and has, as best seen in FIG. 3, a machine mechanism driving shaft 10a thereof directed toward one or the other of the side plates of such framework construction. As illustrated for the present disclosure, such shaft 10a extends freely through an opening 12a in the machine framework left side plate 12, so as to present an interconnected speed control governor 13 therebeyond. While such governor 13 may follow any one of the numerous and well known forms, same, as understood from both FIGS. 2 and 3, is herein made up of a mounting member 14 secured, by means of a set screw 15, to the free end portion of the driving shaft 10a; of an O-shaped leaf spring 16 secured at diametrically opposing zones to outer ear portions 14a of such mounting member 14 (see also FIG. 4); of spaced-apart weights 18 secured to the leaf spring 16 as diametrically opposing zones and normal to the zone of spring securement to the mounting member 14; of actuating arms 20 secured to such weights 18 and directed inwardly therefrom toward the center of said leaf spring 16; and of a control stud 21 axially alined with the driving shaft 10a and operably interconnected to the adjacent ends of such actuating arms 20. While any suitable means may be employed, rivets 17 and herein disclosed for securing the leaf spring 16 to the mounting member 14, and rivets 19 are herein disclosed for securing the actuating arms 20 to the weights 18 and same to such spring 16 (FIG. 4). As best seen in FIG. 4, the control stud 21 is appropriately slotted so as to be received freely within opposing bifurcations provided in the adjacent free ends of the several actuating arms 20.

Recalling the usual operation of governors and the like, it is clear that each of the several weights 18 will move inwardly under the influence of centrifugal action during each operation of the motor 10—that is, toward engagement with upper and lower stop flanges 14b of the governor mounting member 14, as provided immediately therebehind (FIG. 3). Of course, the extent of inward movement of such weights 18 is determined by the speed of the motor carried driving shaft 10a. As understood from both FIGS. 3 and 4, inward movement of the weights 18 cause the free end portions of the interconnected actuating arms 20 to move outwardly and away from the end of the motor carried shaft 10a. As this is done, the associated control stud 21, while remaining axially alined therewith, likewise moves away from the end of such shaft 10a (to the right in FIG. 3) a precise distance corresponding to the speed of the motor 10. Of course, the leaf spring 16, in attempting to retain its normally planar state and hence continually resisting the centrifugal force acting upon the weights 18, will return such weights to their normal, outer positions (as shown) immediately upon the motor 10 coming to rest. As such time the control stud 21 will move inwardly to its normal position (also as shown). Since the outward movement of such control stud 21 is exactly proportional to the speed of the motor 10 in each instance, it is clear that machine speed may be easily measured by any appropriate sensing means caused to be then operated thereby.

As presently employed (FIGS. 1, 2 and 3), such a sensing means includes a normally open switch member 22 carried by a support frame 23, mounted, as best seen in FIG. 3, to an auxiliary plate member 24 of the machine main framework. As shown, the auxiliary plate member 24 is bolted to the outer surface of the machine framework left side plate 12, at the zone thereof to present a switch operating arm 25 immediately behind the above-mentioned control stud 21. While the switch member 22 may follow any convenient form, same, as included herein (FIGS. 1 and 3), is made up of a central blade portion 22a and an upper U-shaped contact plate portion 22b, each carrying a companion switch contact alined one behind the other. The operating arm 25, which is herein shown as being an adjustable stud, is carried by the switch member blade portion 22a. With such overall construction it is apparent that any outward movement of the governor-controlled stud 21, in acting upon the associated switch operating arm 25, will cause the switch blade 22a to move its contact toward that contact carried by the switch plate 22b, in turn closing the switch member 22 when, and only when, the machine motor 10 reaches that speed considered sufficient for safe and efficient operation of the particular machine in use. The precise speed (in cycles per minute) required to close such switch member 22 of course will be dependent both upon the weight of the switch blade 22a and upon the selective adjustment of the operating arm 25 thereof with respect to the control stud 21—that is, whether or not a spacing exists therebetween, and if so, the precise extent thereof.

A final element of the present invention consists of a manually resettable relay member available commercially under numerous descriptions—such as thermo-overload devices, temperature-overload relays, thermally-actuated relays or switches, and even merely thermo protectors. Regardless of the descriptive terminology used, operation of such a member, herein referred to as relay 26 (FIG. 1), depends upon the physical change of certain materials employed therein under the influence of heat. As diagrammatically illustrated in FIG. 5, a bi-metallic strip 27 included in the construction of such relay 26 will bias to a position reversely of that illustrated for opening normally closed contacts of such relay whenever the proper amount of heat is applied thereto by or from an associated resistor 28. This, it is clear, breaks a normal current passing condition of such relay 26. As known to those versed in the art, both the bi-metallic strip 27 and the associated resistor 28 are calibrated for precise heat dissipation and heat production, respectively—that is, a reverse bias or change-over of the bi-metallic strip 27 will be had whenever same reaches a precise temperature range in whole or in part supplied by the resistor 28. Of course, heat produced in the resistor 28 will be determined by the rate of current flow therethrough, by the duration of current flow therethrough, and by the ohmic rating thereof. From this it is clear that time is required to heat the resistor 28 to that temperature calibrated for changing over the associated bi-metallic strip 27, and that such time (normally in seconds) will vary as either the amount or duration of current flow is caused to be changed for one reason or another.

While not being limited to same, for present disclosure purposes it may be stated that a change-over of the bi-metallic strip 27 will be had whenever a temperature of two hundred and forty-eight degrees Fahrenheit is reached within the relay 26. Stated another way, if the rate of heat dissipation from the resistor 28 to the bi-metallic strip 27 remains less than two hundred and forty-eight degrees, no change-over of such strip 27 is had and the relay contacts, as illustrated (FIG. 5), stay biased in their normal, current passing position.

Of course, when once the heat produced by the resistor 28 causes the bi-metallic strip 27 to change-over, i.e.— reversely to that illustrated in FIG. 5 so as to present the relay contacts in a current non-passing position, return bias of such strip 27 to normal is permitted only after the heat developed therewithin is reduced below the change-over temperature factor. To so do this, relay 26 includes in its construction a manually-depressible push button 29 arranged for effecting a reversal in bias to the strip 27. Through depression of such button 29, the strip 27 may be physically returned to its normal, current-passing position after having cooled sufficiently—that is, below the temperature which caused same to change-over in the first place.

As illustrated in FIG. 5, the motor 10 used to produce cycles of operation of the machine mechanism employed is interconnected to a direct current power source 8, being in the form of a rechargeable battery for the purposes hereof. For the sake of present description, such a battery may be considered as being in the neighborhood of 10 volts, which is sufficient, and which will remain sufficient until discharged to approximately 8 volts, to operate the machine mechanisms at what is considered to be a safe and efficient speed. Of course, such power source 8 may likewise be of the alternating current type, if desired, all depending upon the windings of motor 10 included in the machine construction.

As is usual for machines of the type herein considered, the initiation of a cycle of operation is effected through depression of a motor bar or similar starting member, to close a circuit-completing switch 9 wired in series with the power source 8 and the motor 10. All other things being not considered, each closing of such switch 9 initiates a cycle of operation of the motor 10, during the latter part of which, and in the manner well known to the art, such switch 9 becomes automatically restored to its normal, open position. Adding now both the thermally-actuated relay 26 and the speed control switch member 22 in series connection to the above circuit caused to be completed through such starting switch 9, with such switch member 22 defining a potential by-pass circuit path around the relay 26, as same is so illustrated in FIG. 5, the following machine mechanism protection will automatically exist during each cycle of operation of the motor 10.

As understood from FIG. 5, initial cycling of the motor 10 is through the starting switch 9 and the relay 26 which, as is known, has its bi-metallic strip 27 normally biased in a current passing position. Soon after cycle commencement, the normal starting torque of such motor causes same to reach its prescribed speed and close the normally open switch member 22 through operation of the associated governor 13 (see also FIG. 3). As this happens, the motor-energizing current, in following the path of least resistance, will then flow through each of the closed switches 9 and 22. This, in effect, takes the relay 26 out of the circuit for that period of cycling time that the machine mechanism driving shaft 10a is operating at the desired speed. Hence, while the relay 26 is continually made available for initiating a cycle of operation of the driving motor 10, and through which the starting current of such motor 10 is always had, the governor-controlled switch member 22 is so arranged therewith to determine the length of time that such relay 26 remains effective during each machine cycle of operation. For purposes of the present disclosure, it may be stated that the in-circuit time of the relay 26, when normal conditions exist for both the machine power supply and included mechanisms, is but a negligible amount of the overall motor-cycling time from machine operation commencement; in turn realizing the greatest efficiency of such power supply since the resistor 28 (power loss device) is removed from the motor driving circuit during the major portion of each machine operation.

In view of this overall arrangement, it is clear that the in-circuit time of the relay 26, when both the power source 8 and the various mechanisms employed in the machine are up to operating standards—that is, being charged to between 8 and 10 volts and being free to operate smoothly, respectively, is far less than that required for the resistor 28 to heat the bi-metallic strip 27 to the above change-over temperature. Thus, whenever the machine to which the present invention is applied is functioning properly, i.e., is cycling at or extremely near the speed best suited therefor, the rate of heat dissipation from the resistor 28 to the bi-metallic strip 27 will never be great enough to effect a change-over of the relay 26 from its normal, current passing condition. During each machine operation, the speed of the motor 10, in closing the associated switch member 22 soon after cycling commences, limits the duration of current flow through the relay 26 to something less than that needed for gaining the change-over temperature therewithin. Machine cycles of operation may hence be regularly initiated, one after the other.

Should, however, the cycling speed of motor 10 fall below that prescribed for safe and efficient operation for either of the reasons heretofore mentioned—namely, discharging of the power source 8 beyond a specified amount or encountering mechanism failure of a sufficient magnitude, the governor-controlled switch member 22 will not close, or at best, will close only after a major portion of the machine cycle of operation has been completed. In either event, the in-circuit time of the relay 26 will now be sufficient to develop the required heat in the resistor 28 for changing over the associated bi-metallic strip 27, in turn causing same to automatically bias to a current, non-passing position. With such done, further starting current to the motor 10 for a next machine cycle of operation cannot be had until such bi-metallic strip 27 is manually returned to its normal, current passing position (as illustrated) through depression of the associated push button 29. This, of course, cannot be done until the such strip 27 has cooled sufficiently. Further, even though such strip 27 is so returned, same will not regain any amount of permanency until the reason for the slower-than-desired machine cycling speed, be it in the power source of the machine or in the mechanisms of the machine, is located and corrected.

While there is provided herein a rather unique and simplified construction, and one which is extremely effective for the purposes intended, it is obvious that both structural changes and electrical changes may be made without departing from the spirit of the invention. Therefore, it is desired that the present invention be not limited to that precise form beyond the limitations which may be imposed by the following claim.

What is claimed is:

In combination with a business machine having actuating mechanism designed for safe and efficient operation within limits of a prescribed machine cycling speed, an electric motor effective for driving the machine at said prescribed cycling speed; a battery for operating said motor; a first circuit path between said motor and said battery; a thermally-actuated relay in said first circuit path; said relay including contacts normally biased in a current-passing condition and an associated resistance heater for transferring said contacts to a current non-passing condition after timed current flow through said first circuit path; a second circuit path between said motor and said battery; normally open switch means in said second circuit path; machine operation initiating means for interconnecting said motor with said battery through said first circuit path; a governor member operably responsive to the operation of said motor; and a switch operating member operably responsive to the operation of said governor member for closing said second circuit path switch means whenever motor operation causes said machine to reach its prescribed cycling speed during operation thereof initiated through said first circuit path, whereby further current flow between said motor and said battery during the machine operation so initiated is through said second circuit path for a time sufficient to then prevent said resistance heater from transferring said relay contacts.

References Cited by the Examiner
UNITED STATES PATENTS
2,085,116 6/1937 McShane _____ 318—447
2,986,685 5/1961 Epstein _____ 318—472 X

References Cited by the Applicant
UNITED STATES PATENTS
2,363,310 11/1944 Fritz.
2,474,595 6/1949 Richardson.
3,071,719 1/1963 Latter.

ORIS L. RADER, *Primary Examiner.*

J. C. BERENZWEIG, *Assistant Examiner.*